No. 658,250. Patented Sept. 18, 1900.
F. R. K. ERFMANN.
CHEMICAL APPARATUS.
(Application filed Feb. 12, 1900.)
(No Model.)
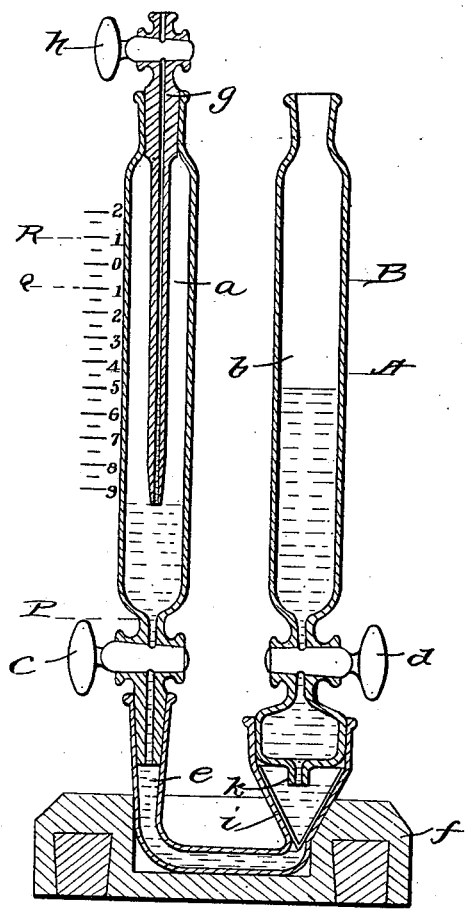

UNITED STATES PATENT OFFICE.

FERDINAND RUDOLF KAREL ERFMANN, OF ROTTERDAM, NETHERLANDS.

CHEMICAL APPARATUS.

SPECIFICATION forming part of Letters Patent No. 658,250, dated September 18, 1900.

Application filed February 12, 1900. Serial No. 5,004. (No model.)

*To all whom it may concern:*

Be it known that I, FERDINAND RUDOLF KAREL ERFMANN, teacher, a subject of the Queen of the Netherlands, residing at 112 Binnenweg, Rotterdam, in the Kingdom of the Netherlands, have invented a certain new and useful Improved Apparatus for Determining the Condition of Water for Steam-Generators, of which the following is a specification, reference being had to the accompanying drawing, in which the figure is a vertical longitudinal section of the apparatus.

My invention relates to an improved apparatus for determining the amount of carbonate of soda or other chemical substance which must be added to the feed-water for steam-boilers in order to avoid incrustation.

Among the impurities of feed-water the sulfates of calcium and magnesium more especially deposit themselves as a hard crust or scale on the boiler-plate. The active means for avoiding the formation of this crust or scale is the treatment of the feed-water with soda or other suitable substance. By the action of sodium carbonate there are formed from the sulfuric-acid salts dissolved in the water insoluble carbonic-acid salts of calcium and magnesium. These salts collect on the bottom of the boiler as a coarse mud and can be easily removed by occasionally blowing off. The amount of these salts contained in the feed-water can be determined by chemical analysis, and from this the weight of soda or other chemical which must be added to the feed-water can be calculated. One is not, however, always in a position to undertake these chemical investigations, and in most cases the boiler attendants lack the necessary knowledge of chemistry. In most works, accordingly, a quite arbitrary quantity of chemicals is added.

My invention has for its object to produce a controlling apparatus by the aid of which the amount of chemicals that must be added for each one thousand kilograms of the boiler-water can be determined in the simplest manner and in a very short time.

The operation of the apparatus is based on the following principle: A definite quantity of boiler-water is caused to react on a definite quantity of a basic solution of definite strength, so that a precipitate is formed. This mixture is filtered, and it is then determined how much of the basic solution still remains in the filtered liquid. For this purpose the base is colored yellow by adding an indicator (methyl orange.) If the base be now neutralized by an acid, the indicator will be colored red by the acid at the moment when the neutralization is complete. These operations can be carried out with the new apparatus in the neatest and simplest manner. After completion thereof the number of kilograms of chemicals which must be added per metric ton of the boiler-water can be read off on a scale.

Referring to the drawing, my apparatus comprises the following parts:

First. A glass vessel $a$, which is open at the top, is provided with graduation-marks, and can be closed at the bottom by a ground-in cock $c$.

Second. A glass vessel $b$ open at the top and on which are two marks—for example, A and B. This vessel is also provided with a cock $d$ at the bottom, and beneath the said cock with a bulb or expansion, which has a narrow tubular aperture $k$ beneath.

Third. A bent tube $e$, which is mounted in a wood base $f$, loaded with lead, or in any other suitable support. This tube $e$ is connected at one end to the vessel $a$ and is formed at the other end into a filtering-funnel, which also receives the lower part of the vessel $b$.

Fourth. A pipette $g$, which extends down to a certain point into the vessel $a$ and which is provided at the top with a cock $h$.

Three dropping-flasks are also required for the test, which, however, are not illustrated in the drawing. The first of these contains the base colored yellow with methyl orange. The second contains the acid, and the third is filled with the water to be tested.

The test is carried out in the following manner: The glass vessel $b$ with the cock $d$ closed is filled up to the mark A with boiler-water and then the yellow-colored base is added, so as to bring the level of the liquid up to the mark B. A precipitate then forms. The bent tube $e$, together with the glass vessel $a$ and the pipette $g$, which have their cocks $c$ and $h$ open, are empty and a filter-paper $i$ is placed in the filtering-funnel. If now the cock $d$ is opened, communication is made between the vessels $a$ and $b$ and the liquid passes out of the vessel $b$ into the vessel $a$, while the precipitate remains behind on the filter-paper $i$. If the liquid does not flow rapidly enough through the filter, the tubular aperture $k$ is kept closed by the rising liquid until a sufficient flow of liquid takes place through the filter, while by means of the compressed air which is in the filtering-funnel the liquid is prevented from rising higher and from flowing away over the edge of the filter-paper $i$. If the vessel $a$ is filled up to the lower edge of the pipette $g$, the air in the vessel $a$ is shut off and the liquid will only rise in the pipette until the levels in the pipette $g$ and in the vessel $b$ are at the same height as shown in the drawing. By means of the pipette therefore a definite quantity only of the liquid rises in the vessel $a$, and the height of the level of the liquid is determined by the position of the lower edge or end of the pipette. The pipette, moreover, serves for permitting the easy removal of the quantity of liquid which has risen in the vessel $a$—i. e., in the pipette—above this point. After this the cock $h$ is closed. It will be seen that by the employment of the pipette the filtration is accelerated and stops as soon as the level of the liquid has risen to the same height in both vessels, and this will be the case sooner when the pipette is employed than when it is not. All the cocks are now closed and the pipette removed. Into the vessel $a$ acid is now allowed to flow until the methyl orange is colored red, as an indication that the base remaining in the liquid has been neutralized. The vessel $a$ is graduated in such a manner that the height of the liquid colored red gives the number of kilograms, for example, of soda to be added to each metric ton of the boiler-water. If the liquid stands at the zero of the scale, it is not necessary to add any soda. If, however, the liquid stands above the zero-point, there is too much soda present in the boiler-water, and there are as many kilograms of soda per ton of boiler-water in excess as there are graduations read off on the scale by the position of the level of the liquid. If instead of soda another chemical substance is employed, the value obtained must be multiplied by a factor determined for this substance.

The scale on the vessel $a$ is determined by titration, wherein account is taken of the composition of the commercial soda employed, the so-called "calcined" soda, and at the same time of the high temperature of the boiler-water at which the chemical action takes place. By these means an apparatus is produced which permits the condition of the boiler-water to be determined exactly in a short time without any knowledge of chemistry and to determine whether soda is present in excess or whether soda must be added to the boiler-water, it being thereby possible to read off on the scale how many kilograms of soda per ton of boiler-water this excess is equivalent to or how much soda must be added.

What I claim is—

1. The combination of two transparent vessels $a$, $b$, open at the top and furnished the one with two datum-marks, and the other with a series of graduation-marks, cocks in said vessels, a bent tube connecting the vessels, a filtering medium in said tube, and a removable pipette in the graduated vessel, substantially as, and for the purpose, described.

2. The combination of two transparent vessels $a$, $b$, open at the top and furnished the one with two datum-marks, and the other with a series of graduation-marks, cocks in said vessels, an enlargement at the lower end of the vessel $b$, an outlet $k$ in said enlargement, a bent tube connecting the vessels, a filtering medium in said tube, a removable pipette fitting in the neck of the graduated vessel and a cock in the pipette, substantially as described, and for the purpose specified.

In witness whereof I have hereunto set my hand in presence of two witnesses.

FERDINAND RUDOLF KAREL ERFMANN.

Witnesses:
WILLIAM LEONARD MIGNON,
LEENDERT PIETER DE NEVE.